March 8, 1949.   H. D. RUSSELL ET AL   2,464,155
STOP BATH ACIDITY INDICATOR
Filed Feb. 9, 1945

JOHN I. CRABTREE
HAROLD D. RUSSELL,
INVENTORS

BY
ATTORNEYS

Patented Mar. 8, 1949

2,464,155

UNITED STATES PATENT OFFICE 2,464,155

STOP BATH ACIDITY INDICATOR

Harold D. Russell and John I. Crabtree, Rochester, N. Y., assignors to Eastman Kodak Company, Rochester, N. Y., a corporation of New Jersey Application February 9, 1945, Serial No. 577,104

6 Claims. (Cl. 23—253)

The present invention relates to an indicator, and more particularly to an indicator for visually indicating the strength or usefulness of a solution such, for example, as the degree of acidity of a photographic acid stop-bath for photographic prints or acid fixing bath for films.

As is well known, photographic prints or negatives, after being developed, are drained briefly and then thoroughly rinsed in an acid stop bath. Such a bath serves to stop further action of the developing agents on the prints or negatives, and also reduces the risk of stains; and, in addition, lengthens the useful life of the fixing bath by neutralizing the alkali of the developer carried over by the prints or negatives, all as well known to those in the art. In order that the stop-bath may be effective, the acidity thereof must be maintained, the advantages of which are obvious.

The present invention has, therefore, as its principal object the provision of an indicator which will visually designate the degree of acidity of the stop or fixing bath and also the changes in such acidity.

Another object of the invention is the provision of an indicator which will designate such acidity and the changes thereof without the necessity of chemical tests.

A further object of the invention is the provision of such an indicator which is suitable for use in a darkroom illuminated by safelights.

Yet another object of the invention is the provision of such an indicator which is simple in construction, easy to use, accurate in its results, and very inexpensive to make.

To these and other ends, the invention resides in certain improvements and combinations of parts, all as will be hereinafter more fully described, the novel features being pointed out in the claims at the end of the specification.

In the drawings.

The same reference numerals throughout the various views indicate the same parts.

The invention relates to an indicator for use with a photographic acid stop-bath or an acid fixing bath to indicate the acidity or the changing of the acidity of the bath during the use thereof. This indicator comprises a base or sheet of paper 11 of such quality as not to disintegrate in an acetic acid solution, and one from which the dye, to be presently described, will not wash out. It has been found that a hardened filter paper meets these requirements and is admirably adapted for use as an indicator base. When prepared for use in an acid stop bath the paper 11 is dyed with a suitable dye such, for example as "Congo red" which colors the paper 11 a bright red or crimson color. This dyed paper is of a bright red color prior to use; but, when placed in an acid solution, such as an acid stop-bath, changes color to a blue-black, but gradually changes back to red again as the bath becomes neutralized or exhausted.

Figure 1:
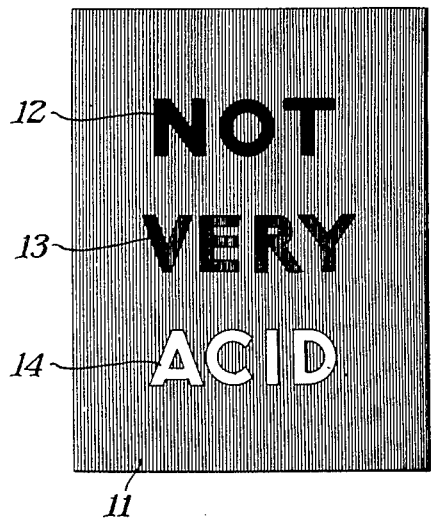
Fig. 1 is a view of the indicator of the present invention, showing the relation of parts prior to their use in a stop or fixing bath and in the condition received by the purchaser or user.
Figure 2:
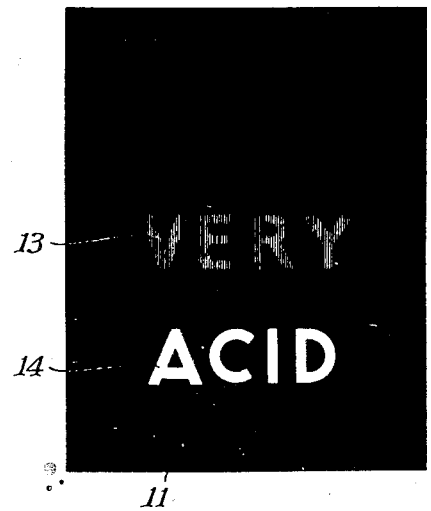
Fig. 2 is a view similar to Fig. 1, but showing the relation of the parts when the indicator is positioned in the bath of the proper acidity to indicate such acidity.

The paper 11 has printed thereon the words "Not," "Very," and "Acid" as shown at 12, 13, and 14 in the drawings. For acid stop-baths, the word "Not" is printed in black ink while the word "Very" is printed in red ink, and the work "Acid" is printed in white ink. The inks used in printing these words may be of any suitable type which are not readily attacked by the chemicals of the stop-bath. The color of the word "Very" is slightly darker than the color of the "Congo red" dye. All the words are, therefore, clearly visible in the new or unused indicator, as shown in Fig. 1. When however, the paper 11 is placed in an acid stop-bath of the proper acidity, the paper will turn blue-black in color. As the word "Not" is printed in black ink it will not now be visible, and only the words "Very acid" can be seen under a Series OO or OA safelight to thus clearly and visibly indicate that the bath is of the proper acidity, as clearly illustrated in Fig. 2.

Figure 3:
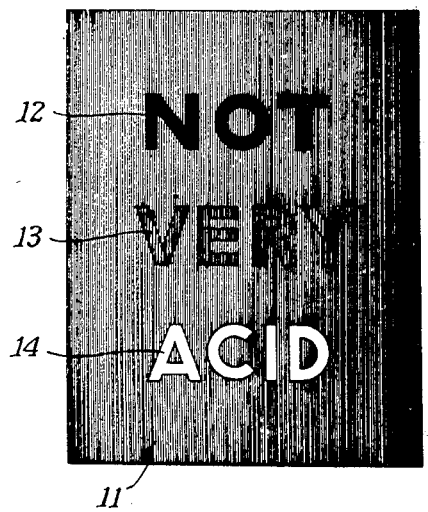
Fig. 3 is a view similar to Figs. 1 and 2, but showing the relation of parts when the solution or bath is partly neutralized.
Figure 4:
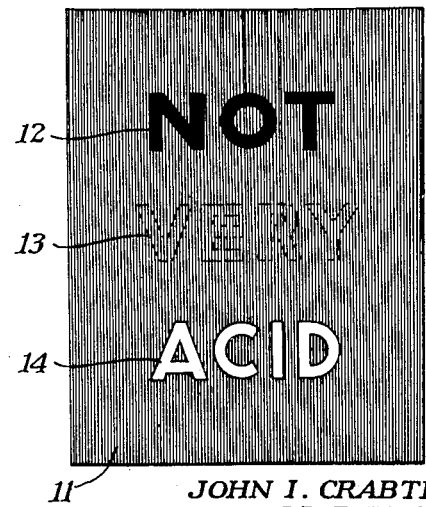
Fig. 4 is a view similar to the other views but showing the relation of parts when the solution has been exhausted to indicate that the bath is no longer useful and should, therefore, be discarded or replenished.

However, as the stop-bath is used, it will be gradually neutralized due to the alkali of the developer. Due to such neutralization, the paper 11 will gradually turn from the blue-black color illustrated in Fig. 2 back to the original red color, and the word "Not" will gradually become more and more visible, while the word "Very" will gradually become invisible. At or near a certain acidity both "Not" and "Very" will both be visible so that the paper will read "Not very acid" to indicate that the stop-bath is not very acid, as illustrated in Fig. 3. Finally, when the bath has been neutralized to a point where it is no longer useful, the paper 11 will return to its red color and the word "Very" will become substantially invisible under the safelight. The words "Not" and "Acid" will then be the only words visible to clearly indicate that the solution is not acid, as illustrated in Fig. 4.

Thus when the solution is very acid the words "Very acid" are visible to indicate the solution is of sufficient acidity, but on partial neutralization the words "Not very acid" are all visible to indicate that the solution is no longer at its original strength or acidity. Finally when the solution has been exhausted only the words "Not acid" are visible to indicate the lack of efficiency of acidity. Thus the paper will change color as the acidity of the bath varies, and the differently colored words serve to indicate not only the degree of acidity of the stop-bath, but also the changing of such acidity.

When the bath has been completely neutralized the words "Not acid" appear, and the bath should be discarded or renewed with a quantity of acid equal to that originally present in the bath. The test paper 11, in the renewed solution, will not be colored blue-black, as in the fresh solution but will indicate that the bath is partially exhausted. Furthermore, the life of the bath before the words "Not acid" appear will be approximately two-thirds that of the fresh solution. With use, the color of the paper gradually fades, and an old paper, which has been used several times, may not give exactly the same color reaction as that of a fresh paper. However, the paper may be used safely and reliably for about one week. The dry unused paper indicator should, however, be stored in an air-tight container in a darkroom as the paper will tend to bleach in sunlight and will change color if stored in a room in which there are acid vapors.

While the above indicator has been described primarily with relation to an acid stop-bath for prints, such an indicator is also adapted for use in an acid fixing bath which functions in the same manner as a stop-bath, namely, it arrests development and prevents the formation of silver stains.

As a hardening fixing bath becomes neutralized, it gradually loses its hardening properties, and with baths containing aluminum and chrome alum, when the pH of the bath reaches a definite value, the bath tends to precipitate a sludge of aluminum or chromium hydroxide which may deposit as a scum on the film. It is important, therefore, to discard or revive an acid fixing bath when the pH reaches a definite limiting value.

The "Congo red" indicator paper functions satisfactorily in certain fixing baths, specifically, a "Kodak F-5" fixing bath. When such a bath is fresh, the bath has a pH value of 4.0 and a value of 6.0 when exhausted at which time the indicator will designate "Not acid." With another fixing bath, such as the "Kodak F-6" odorless fixing bath, the "Eastman X-Ray Fixer" (powders), and the "Kodak Liquid X-Ray Fixer," the fresh bath has a pH value of 4.6 which rises to 6.0 on exhaustion. With this latter bath it would be necessary to change the word "Not" to a reddish blue, which is the hue of the "Congo red" at pH of 4.6.

With chrome alum stop baths and chrome alum fixing baths, it will be necessary to change both the background dye and the inks. When fresh, the pH value of these baths is about 3.0 which rises to 4.0 on exhaustion. For use in such baths, it is preferred to have the paper 11 dyed or colored with a brom phenol blue which is yellow at a pH of 3.0 and changes to blue at 4.0. The words would then be colored as follows:

"Not"—Yellow
"Very"—Blue-green
"Acid—Remaining white

An alternative indicator dye is benzo purpurin which changes from violet at a pH of 3.0 to red at a pH of 4.0 so that the same color inks could be used as in the stop-bath arrangement, above described.

The above-described indicator thus provides a simple, inexpensive and readily readable means for indicating not only the actual acidity of an acid stop or fixing bath but also the changing of such acidity. Such an indicator may be placed in the tray holding the solution or may be attached to the tray by means of adhesive strip or clip but extending into the solution. As the color change of the paper requires about one minute, the paper indicator is not recommended for dipping tests but only for tests in which the indicator remains in the solution for a substantial time.

While one embodiment of the invention has been disclosed, it is to be understood that the invention may be carried out in a number of ways. This application is not, therefore, to be limited to the precise details described, but is intended to cover all variations and modifications thereof falling within the scope of the appended claims.

We claim:

1. An acidity indicator comprising, in combination, a paper sheet dyed with a Congo red dye so that the sheet will have a dark color when placed in an acid solution but will gradually turn back to red as the solution becomes neutralized, three indicating symbols printed on said dyed sheet, each symbol being printed in a different color ink so that when the sheet is in acid solution, only two of said symbols will be visible to indicate that the solution is acid, but as the solution becomes neutralized, one of said two symbols will become substantially invisible in a weak illumination while a third symbol will become visible and cooperate with the other of said two symbols to indicate that the solution has been neutralized.

2. An acidity indicator comprising, in combination, a paper sheet dyed with a Congo red dye so that when in an acid solution the sheet will be of a dark color but will gradually turn to red as the solution becomes neutralized, a word "Not" printed with black ink on said dyed sheet, a word "Very" printed with red ink on the dyed sheet, and a word "Acid" printed in white ink on said sheet, said inks being stable and not attacked by said solutions, the words "Very" and "Acid" being visible when the sheet is in an acid solution to indicate visually the acidity but the word "Very" becoming substantially invisible in a weak illumination and the word "Not" becoming visible and cooperating with the word "Acid" when the solution has become neutralized to indicate that the solution is now neutralized.

3. An acidity indicator comprising a paper sheet impregnated with an indicator which is red in a neutral solution and black in an acid solution, and superimposed markings thereon, one of said markings being of such red coloration to blend with the color of the sheet when moistened with neutral solution and contrasting with the black coloration of the sheet when the sheet is moistened with acid.

4. An acidity indicator comprising a paper sheet impregnated with an indicator which is red in a neutral solution and black in an acid solution, and superimposed markings thereon, certain of said markings being of such colorations to contrast with the black coloration of the sheet when the sheet is moistened with an acid solution but one of said certain markings being of such red coloration as to blend with the red coloration of the sheet when the latter is moistened with a neutral solution, and another superimposed marking being of such black coloration to contrast with the red coloration of the sheet when the sheet is moistened with a neutral solution but blending with the black coloration of the sheet when the sheet is moistened with an acid solution.

5. An acidity indicator comprising a paper sheet impregnated with an indicator which is red in a neutral solution and black in an acid solution, and three superimposed color markings thereon, one of said markings being of a white coloration so as to contrast with the red coloration of the sheet when the sheet is moistened with a neutral solution and also to contrast with the black coloration of the sheet when moistened with an acid solution, a second marking of such red coloration to contrast with the black coloration of the sheet when the sheet is moistened with an acid solution and co-operating with said white marking to indicate the acidity of the solution, said red marking blending with the red coloration of the sheet when the sheet is moistened with a neutral solution, and a third marking of such black coloration as to blend with the black coloration of the sheet when moistened with an acid solution but to contrast with the red coloration of the sheet when moistened with a neutral solution and co-operating with said white marking to indicate a neutral solution.

6. An acidity indicator comprising a paper sheet impregnated with an indicator which is one color in a neutral solution and a different and contrasting color in an acid solution, superimposed markings thereon, one of said markings being of such coloration to blend with the color of the sheet when moistened with a neutral solution and contrasting with the color of the sheet when the sheet is moistened with acid.

HAROLD D. RUSSELL.
JOHN I. CRABTREE.

REFERENCES CITED

The following references are of record in the file of this patent:

UNITED STATES PATENTS

| Number | Name | Date |
|---|---|---|
| 691,249 | Dieterich | Jan. 14, 1902 |
| 2,167,304 | Kloz | July 25, 1939 |
| 2,249,867 | Snelling | July 22, 1941 |
| 2,314,548 | McClintock | Mar. 23, 1943 |

FOREIGN PATENTS

| Number | Country | Date |
|---|---|---|
| 457,083 | France | July 4, 1913 |
| 579,179 | Germany | June 22, 1933 |